United States Patent
Merkel et al.

(10) Patent No.: US 10,647,403 B2
(45) Date of Patent: May 12, 2020

(54) ACTUATABLE EMERGENCY EXIT DOOR AND AN AIRCRAFT OR SPACE CRAFT WITH A PRESSURIZED CABIN HAVING SUCH AN ACTUATABLE EMERGENCY EXIT DOOR

(71) Applicant: AIRBUS HELICOPTERS DEUTSCHLAND GMBH, Donauworth (DE)

(72) Inventors: Christoph Merkel, Sontheim an der Brenz (DE); Stephen Ward, Donaumuenster (DE); Michal Vinarsky, Augsburg (DE); Florian Naumann, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 350 days.

(21) Appl. No.: 15/785,821

(22) Filed: Oct. 17, 2017

(65) Prior Publication Data

US 2018/0134366 A1 May 17, 2018

(30) Foreign Application Priority Data

Nov. 16, 2016 (EP) ..................................... 16400053

(51) Int. Cl.
  *B64C 1/14* (2006.01)
  *B64G 1/60* (2006.01)

(52) U.S. Cl.
  CPC ............ *B64C 1/143* (2013.01); *B64C 1/1423* (2013.01); *B64C 1/1461* (2013.01); *B64G 1/60* (2013.01)

(58) Field of Classification Search
  CPC ... B64C 1/1407; B64C 1/1415; B64C 1/1423; B64C 1/143; B64C 1/1438; B64G 1/60
  See application file for complete search history.

(56) References Cited

U.S. PATENT DOCUMENTS 4,510,714 A   4/1985   Kasper et al.
5,031,863 A   7/1991   Noble
(Continued)

FOREIGN PATENT DOCUMENTS

CN   204433025 U   7/2015
ES   2436508 T3   1/2014
(Continued)

OTHER PUBLICATIONS

Federation Aviation Administration, DOT, Section 25.807, "Emergency Exits", 13 pages.
(Continued)

*Primary Examiner* — Nicholas McFall
(74) *Attorney, Agent, or Firm* — Brooks Kushman P.C.

(57) ABSTRACT

An actuatable emergency exit door with a door actuating device that comprises at least two connection rods that are pivotally mountable to an associated structural frame that is adapted for accommodating the actuatable emergency exit door in closed state, the at least two connection rods being provided for enabling an opening movement of the actuatable emergency exit door with respect to the associated structural frame during opening, wherein at least one door-mounted goose neck-shaped structure is mountable to the associated structural frame for enabling an initial translational opening movement and subsequently a swiveling opening movement of the actuatable emergency exit door with respect to the associated structural frame during opening. The invention is further related to an aircraft or space craft with a pressurized cabin having such an actuatable emergency exit door.

20 Claims, 8 Drawing Sheets

(56) References Cited

U.S. PATENT DOCUMENTS 5,931,415 A 8/1999 Lingard et al.
2015/0014483 A1* 1/2015 Minchau ................. B64C 1/143
244/129.5

FOREIGN PATENT DOCUMENTS

FR 2794717 A1 12/2000
WO 2015132167 A1 9/2015

OTHER PUBLICATIONS

CS-25 Book 1, Section 25.807, "Emergency Exits", 4 pages.
European Search Report for European Application No. EP 16400053, Completed by the European Patent Office, dated Apr. 12, 2017, 9 pages.

* cited by examiner

ACTUATABLE EMERGENCY EXIT DOOR AND AN AIRCRAFT OR SPACE CRAFT WITH A PRESSURIZED CABIN HAVING SUCH AN ACTUATABLE EMERGENCY EXIT DOOR

CROSS-REFERENCE TO RELATED APPLICATIONS

This application claims priority to European patent application No. EP 16400053.1 filed on Nov. 16, 2016, the disclosure of which is incorporated in its entirety by reference herein.

BACKGROUND OF THE INVENTION

(1) Field of the Invention

The invention is related to an actuatable emergency exit door with a door actuating device that comprises at least one door-mounted goose neck-shaped structure. The invention is further related to an aircraft or space craft with a pressurized cabin having such an actuatable emergency exit door.

(2) Description of Related Art

In general, actuatable emergency exit doors of airplanes must fulfil predefined airworthiness requirements in order to allow for a safe, secure and reliable operation of respective airplanes. Such airworthiness requirements are defined in applicable safety regulations and specifications, such as the US-American Federal Aviation Regulations (FAR) from the US-American Federal Aviation Administration (FAA) and/or the European Certification Specifications (CS) from the European Aviation Safety Agency (EASA). By way of example, corresponding airworthiness requirements are defined in the EASA CS 25.807, resp. FAA FAR 25.807, which distinguishes between different types of emergency exit doors for passenger aircrafts with regard to an underlying capacity of passengers.

More specifically, in order to comply with currently applicable airworthiness requirements, actuatable emergency exit doors must be designed such that, when operated, these actuatable emergency exit doors are automatically disposed so that they can neither reduce respective sizes of associated exit openings, nor respective passageways leading to these exit openings, nor respectively specified unobstructed spaces to below prescribed required minimum dimensions. Furthermore, when opened to respective fully opened positions, these actuatable emergency exit doors must also not obstruct egress from the exit openings via prescribed subsequent escape routes.

Usually, an underlying opening path of a respective actuatable emergency exit door is slightly inward and upward or downward into an associated intermediate opening position, until a given opening in a corresponding structural frame, to which the actuatable emergency exit door is mounted, is large enough for the actuatable emergency exit door to pass through in an unobstructed manner. Then, the actuatable emergency exit door is rotated outward from the intermediate opening position around a predefined hinge line located at an upper edge of the given opening in the corresponding structural frame into a fully opened position.

Exemplary actuatable emergency exit doors that fulfill these requirements and that are designed with a respective opening path are e. g. described in the documents U.S. Pat. No. 5,031,863.

Similarly, the document U.S. Pat. No. 5,931,415 describes a door adapted for use in an emergency exit opening in the overwing section of an aircraft fuselage, over an aircraft wings. So as to provide movement to the door, various mechanisms are attached to the fuselage and are located substantially within the space between an outer fuselage skin and an interior cabin liner. To rotate the door relatively the aircraft body structure, are provided hinge arms. The hinge arms attached to the fuselage are pivotably mounted to the structure and rotatably engaged with the door. Actuators provide a force against the hinge arms, are attached to the fuselage. A latching assembly is formed between the side surfaces of the door and adjacent body structure. In addition to a hinge guide assembly near the top of the door, a frame guide assembly is mounted on the structure of the aircraft fuselage, towards the bottom of the opening. The door, of plug-type design, has a frame formed from a number of interconnected structural members.

According to both documents, hinge arms with at least partly goose neck-shaped structures are mounted at least in a translationally moveable manner to the actuatable emergency exit doors and in a rotatable manner to associated structural frames to allow a comparatively wide swiveling opening movement of the actuatable emergency exit doors with respect to the associated structural frames. In addition, by mounting the at least partly goose neck-shaped structures at least in a translationally moveable manner to the actuatable emergency exit doors, an initial inward and upward/downward movement of these actuatable emergency exit doors is enabled.

The document FR2794717 describes an aeronautical door which is not hinged to a fuselage of an aircraft, but which is hinged and carried by pivoting arms to move substantially parallel, while making a slight movement of closing so that the door seal is properly seated against a door frame. The fuselage has a cargo hatch, to be closed by the door. The door is carried by two arms which are articulated on the fuselage at four locations. When opened, the cargo hatch door is lowered. The movement of the cargo hatch door is cushioned in order to avoid any shock. The arms have a shape and are arranged in such a way that their middle portions move apart or close to one another. Elastic means are provided between the two he arms. The two arms move away from each other at the opening and the elastic means constituted by springs working in tension, dampen shocks.

The document CN204433025 describes a system design for operating a trunk door, having a spring shaft, a spring, a crank rod, a door connecting screw for the crank rod, and a covering shell. The crank rod, which is L-shaped, is hinged at the end of a trunk box through the crank shaft while the spring is hinged at the middle of the crank rod. Another end of the spring is passed through the door connecting screw. A cover case is connected to the end plate of the trunk box by means of a casing fixing screw. The system is driven by a spring to rotate the crank rod so as to be fixed to the trunk door at the other end of the crank rod and in turn on both sides of the channel.

The document US 2015/0014483 A1 describes an actuatable emergency exit door with a similar design. Nevertheless, instead of hinge arms with at least partly goose neck-shaped structures, a comparatively heavy and huge single main hinge is provided, which implies an important weight penalty to this actuatable emergency exit door.

However, it should be noted that in all actuatable emergency exit doors described above, respective actuators that are used for biasing the actuatable emergency exit doors during opening into their fully opened positions are mounted to the respectively associated structural frames. This requires a reinforcement of the associated structural frames that must be adapted to absorb all comparatively high loads occurring during the opening into the fully opened position, thus, implying weight penalties because of the reinforcement. In fact, these high loads result from a respective opening torque moment that is created by the actuatable emergency exit doors during the opening. Furthermore, provision of the respective actuators at the respectively associated structural frames wastes comparatively much space outside of the actuatable emergency exit doors.

It should also be noted that alternative actuatable emergency exit doors are also already known, e. g. from the document WO 2015/132167 A1. However, this actuatable emergency exit door does not provide a completely freed and unobstructed exit area, as in fully opened position thereof a comparatively big part thereof remains in a respective passenger's escape route.

BRIEF SUMMARY OF THE INVENTION

It is, therefore, an object of the present invention to provide a new actuatable emergency exit door that ensures a required opening movement within respectively available space into a fully opened position such that an associated emergency exit area is completely freed and unobstructed, while providing for a reduced overall weight and acceptable costs. Furthermore, it is an object of the present invention to provide a new aircraft or space craft with a pressurized cabin comprising such a new actuatable emergency exit door.

This object is solved by an actuatable emergency exit door, said actuatable emergency exit door comprising the features of claim 1.

More specifically, according to the present invention an actuatable emergency exit door comprises a door actuating device with at least two connection rods, at least one door-mounted goose neck-shaped structure and at least one spring member. The at least two connection rods are pivotally mountable to an associated structural frame that is adapted for accommodating the actuatable emergency exit door in closed state. The at least two connection rods are provided for enabling an opening movement of the actuatable emergency exit door with respect to the associated structural frame during opening. The at least one door-mounted goose neck-shaped structure is mountable to the associated structural frame for enabling an initial translational opening movement and subsequently a swiveling opening movement of the actuatable emergency exit door with respect to the associated structural frame during opening. At least one of the at least two connection rods is coupled to the at least one spring member that is provided for biasing the actuatable emergency exit door during opening into a fully opened position in which the actuatable emergency exit door entirely frees exit through the associated structural frame.

According to one aspect, the inventive actuatable emergency exit door initially performs a lowering movement relative to the associated structural frame during opening until a fully lowered position is reached. This lowering movement is preferably accompanied by an inward movement, both of which are enabled by means of the at least one door-mounted goose neck-shaped structure. The inward movement is particularly advantageous if the associated structural frame is e. g. part of an airplane, as a reduced set of requirements applies to initially inward moving doors.

The lowering movement and the inward movement preferentially represent the above-mentioned initial translational opening movement.

Subsequently, the inventive actuatable emergency exit door preferably performs an upward swiveling opening movement at the associated structural frame starting from the fully lowered position until a fully opened position is reached. This upward swiveling opening movement is performed automatically, i. e. without need for an operator-supported action. Preferentially, in the fully opened position, a fully opened position retaining device blocks the inventive actuatable emergency exit door in order to prevent closure thereof.

Preferably, the inventive actuatable emergency exit door is connected to the associated structural frame using two levers, which are each connected to an associated door-mounted goose neck-shaped structure and which are provided for rotation of the inventive actuatable emergency exit door around a first hinge axis defined at the associated structural frame. The connection of the two levers, with the associated door-mounted goose neck-shaped structures preferentially defines a second hinge axis for rotation of the inventive actuatable emergency exit door. The inventive actuatable emergency exit door is preferably further connected to the associated structural frame by means of connection rods, which are provided for rotation of the inventive actuatable emergency exit door around a third hinge axis.

According to one aspect, an underlying opening path of the inventive actuatable emergency exit door is implemented as a two-phase opening movement, as already described above. In other words, in a first phase the above-mentioned initial translational opening movement is performed and in a second phase the above-mentioned swiveling opening movement is performed.

More specifically, the first phase preferably begins with operation of an inner or outer operating handle of the inventive actuatable emergency exit door in its fully closed position. As a result, all applied devices that secure the inventive actuatable emergency exit door in the fully closed position, i. e. respective latch levers and latches, which are exemplarily implemented and hereinafter also referred to as latch levers rollers or latch rollers, are rotated in a disengaging direction by respective overcenter rods. The latch levers and latch levers rollers then preferably continue to rotate until contact is made with a corresponding structural frame-mounted latch bracket. By still continuing to operate the operating handle, a force exerted on the structural frame-mounted latch bracket will then move the inventive actuatable emergency exit door in a downward, i. e. lowering direction.

An underlying downward path of this lowering movement is preferably ensured by at least two door-mounted fingers, with integrated door guide rollers, in order to minimize friction. These door guide rollers preferentially move within two associated tracks, i. e. structural frame-mounted guide roller brackets, which are mounted to the associated structural frame adjacent to the door-mounted fingers. A necessary degree of freedom which allows the inventive actuatable emergency exit door to follow this downward path is given by freedom to rotate around the first and second hinge axes.

As described above, the inventive actuatable emergency exit door is also connected to the associated structural frame by means of the connection rods, which are provided for rotation of the inventive actuatable emergency exit door around the third hinge axis. Therefore, the connection rods are rotatably connected e. g. at one axial end to the associated structural frame. At their other axial end, the connection rods are preferentially connected to levers provided within the inventive actuatable emergency exit door. These levers are preferably free to rotate around a fourth hinge axis and they are rotated around this fourth hinge axis during a relative door-to-frame motion during the initial translational opening movement, more particularly during the lowering movement of the inventive actuatable emergency exit door.

Preferably, the rotation of the levers moves associated spring members, which are connected to the levers, from an overcentered position through a so-called dead center into an opening support position. In the overcentered position, the associated spring members bias the connection rods into an associated overcentered position in the closed state of the actuatable emergency exit door. At the dead center, the load in the connection rods preferentially changes from tension into compression. The force provided by the spring members then assists the initial translational opening movement, more particularly the lowering movement of the inventive actuatable emergency exit door. The inventive actuatable emergency exit door will, thus, continue the initial translational movement until the fully lowered position is reached, wherein the associated door-mounted goose neck-shaped structures preferably contact associated structural stops provided on the associated structural frame. Then, the second phase begins.

In the second phase, the door guide rollers are in a released state wherein they can move in an outward direction out of the structural frame-mounted guide roller brackets through respective openings provided in the associated structural frame. While the door guide rollers are in the released state, a respective compression load in the connection rods resulting from the force provided by the spring members is reacted into the associated structural frame at the above-mentioned third hinge axis, thus, generating a moment about the above-mentioned second hinge axis, resulting in the inventive actuatable emergency exit door rotating, i. e. swiveling in the outward direction.

This outward, opening rotation, which represents the swiveling opening movement, continues until the actuatable emergency exit door reaches its fully opened position. Upon reaching the fully opened position, preferably the above described fully opened position retaining device automatically engages, thus, blocking the inventive actuatable emergency exit door in order to prevent closure thereof.

Advantageously, the inventive actuatable emergency exit door exhibits a simplified design compared to conventional actuatable emergency exit doors, but nevertheless fulfils the above-mentioned airworthiness requirements using less constituent components and, therefore, proving an increased reliability. Furthermore, the inventive actuatable emergency exit door requires less space for accommodation of these constituent components, thus increasing e. g. when used with airplanes a respective payload flexibility. Moreover, the reduced number of constituent components leads to less overall weight of the inventive actuatable emergency exit door, as well as reduced recurring and non-recurring costs.

According to a preferred embodiment, at least one door-mounted goose neck-shaped structure is at least rigidly attached to a door corpus of the actuatable emergency exit door.

According to a further preferred embodiment, the at least one spring member is rigidly attached to the door corpus.

According to a further preferred embodiment, the at least one spring member comprises at least one energy storage device. A load generated by the at least one energy storage device during opening of the actuatable emergency exit door into the fully opened position is reacted into the associated structural frame for generating an opening moment.

According to a further preferred embodiment, the at least one spring member is in an overcentered position if the actuatable emergency exit door is in fully closed position. The at least one spring member in the overcentered position loads the actuatable emergency exit door into the fully closed position.

According to a further preferred embodiment, the at least one spring member is in an opening support position during opening of the actuatable emergency door. The at least one spring member in the opening support position loads the actuatable emergency exit door into a fully opened position. The at least one spring member is moved during opening of the actuatable emergency door from the overcentered position into the opening support position.

According to a further preferred embodiment, a fully opened position retaining device is provided.

According to a further preferred embodiment, the fully opened position retaining device comprises a gust lock device that is provided for blocking a swiveling movement of the actuatable emergency exit door relative to the at least two connection rods from the fully opened position into an egress obstructing position.

According to a further preferred embodiment, at least one of the at least two connection rods is provided with a locking bolt that is automatically engaged by the gust lock device when the actuatable emergency exit door reaches the fully opened position during opening.

According to a further preferred embodiment, the gust lock device comprises a locking lever for engaging the locking bolt in a locking position.

According to a further preferred embodiment, the gust lock device comprises a spring element that biases the locking lever into the locking position.

According to a further preferred embodiment, the locking lever is hinged-mounted to a door corpus of the actuatable emergency exit door.

According to a further preferred embodiment, the door actuating device further comprises at least one latch roller that is provided for latching, in a latching position, the actuatable emergency exit door in closed state.

According to a further preferred embodiment, the door actuating device further comprises at least one overcenter connection rod that is provided for blocking the at least one latch roller in the latching position in the closed state of the actuatable emergency exit door.

According to a further preferred embodiment, the door actuating device further comprises at least one latch compression spring that biases the at least one overcenter connection rod into an associated overcentered position in the closed state of the actuatable emergency exit door.

According to a further preferred embodiment, the associated structural frame is defined by a fuselage of an aircraft or space craft with a pressurized cabin, wherein the actuatable emergency exit door defines an emergency exit hatch.

The present invention further provides an aircraft or space craft with a pressurized cabin and an actuatable emergency exit door as described above.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
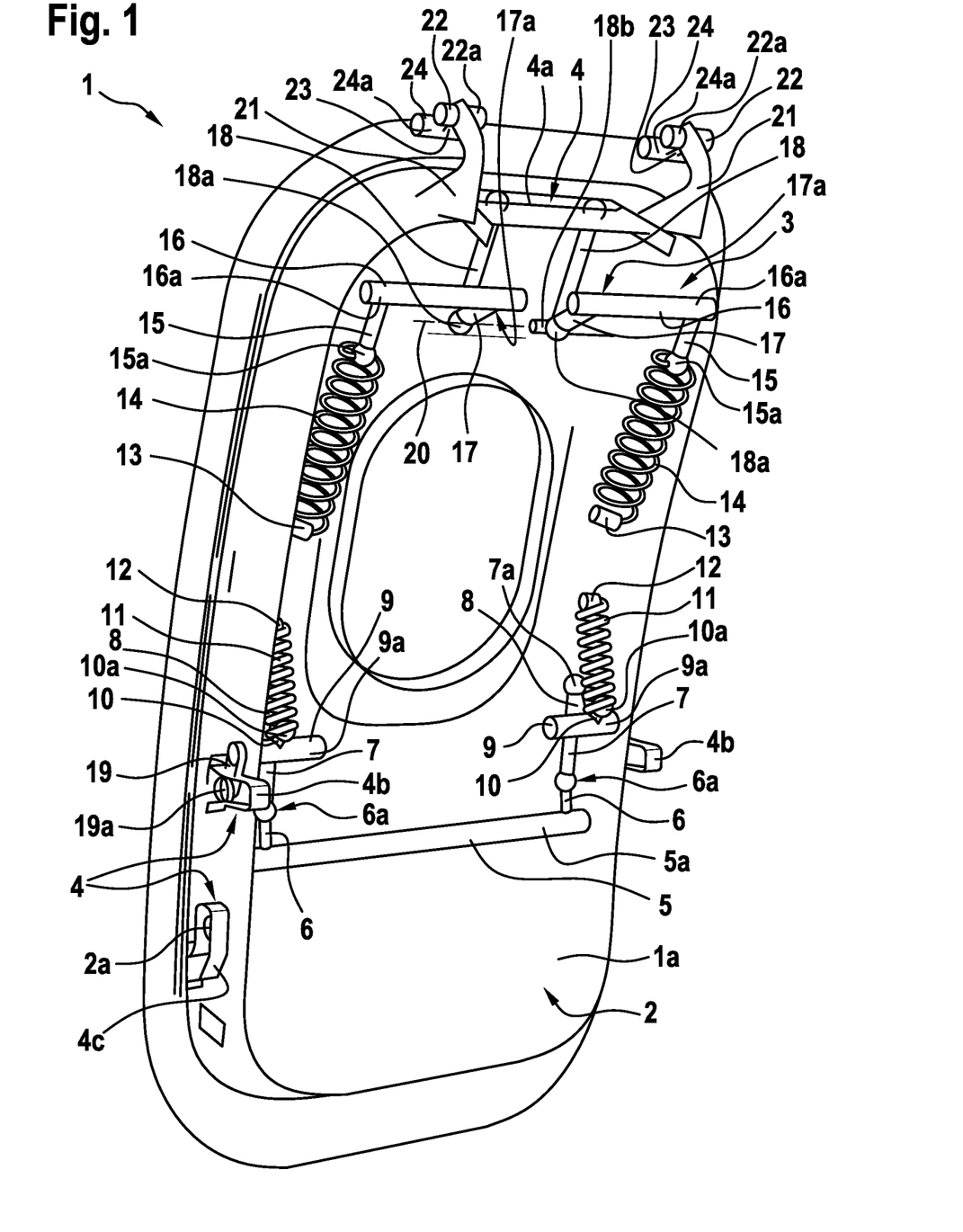
FIG. 1 shows a schematic perspective view of an actuatable emergency exit door with a door actuating device according to the present invention.

FIG. 1 shows an actuatable emergency exit door 1 with a door outer skin 1a, a door corpus 2 and a door actuating device 3 according to the present invention. The door actuating device 3 is preferably adapted for reliably and securely locking said actuatable emergency exit door 1 in a closed position.

The actuatable emergency exit door 1 is preferably adapted to close an associated structural frame 4, such as a fuselage of an airplane, in a fully closed position, preferentially in a fluid-tight manner. In other words, the associated structural frame 4 is adapted for accommodating the actuatable emergency exit door 1 in closed state.

According to one aspect, the actuatable emergency exit door 1 is an overwing emergency exit hatch of an airplane. However, it should be noted that not only airplanes, but also other aircrafts or space crafts with a pressurized cabin can be provided with such an overwing emergency exit hatch. Furthermore, the actuatable emergency exit door 1 is not necessarily implemented as an overwing emergency exit hatch in such aircrafts or space crafts with a pressurized cabin, but can be implemented as an emergency exit hatch in general. Even more generally, various other vessels, such as ships and so on, can be equipped with the inventive actuatable emergency exit door 1, so that the present invention should generally not be construed as being restricted to overwing emergency exit hatches.

Preferably, the actuatable emergency exit door 1 is embodied such that a respective opening movement with respect to the associated structural frame 4 is split into two phases: a first phase that consists of an initial translational opening movement and a second phase that consists of a swiveling opening movement, as described in detail hereinafter. Thereby, the actuatable emergency exit door 1 is moved from the fully closed position into a fully opened position in which the actuatable emergency exit door 1 entirely frees exit through the associated structural frame 4.

The initial translational movement is preferably adapted to allow at least an unlatching of the actuatable emergency exit door 1 during opening, as well as a release thereof, so that a subsequent performance of the swiveling opening movement is enabled. Therefore, the door actuating device 3 preferably comprises a first predetermined number of components that is preferentially dedicated to unlatching and releasing of the actuatable emergency exit door 1 during the initial translational movement.

The swiveling opening movement is preferably adapted for movement of the unlatched and released actuatable emergency exit door 1 into the fully opened position during opening. Therefore, the door actuating device 3 preferably comprises a second predetermined number of components that is preferentially dedicated to swiveling of the actuatable emergency exit door 1 during the swiveling opening movement.

According to one aspect, the door actuating device 3 comprises at least one actuatable drive shaft 5. The latter is rotatable around an associated drive shaft rotation axis 5a for actuation of the door actuating device 3. The associated drive shaft rotation axis 5a is preferably arranged stationary, i. e. immovable in the door corpus 2. In other words, the at least one actuatable drive shaft 5 is preferably rotatable, but not otherwise moveable in the door corpus 2.

Preferably, the at least one actuatable drive shaft 5 is rigidly attached to at least one and, preferentially, to two drive shaft connection levers 6. The at least one actuatable drive shaft 5 and the two drive shaft connection levers 6 may also be embodied integrally, i. e. in one piece. Each drive shaft connection lever 6 is preferably connected via an associated pivot bearing 6a to an overcenter connection rod 7. Illustratively, two such overcenter connection rods 7 are provided and exemplarily arranged laterally with respect to the door corpus 2.

Each overcenter connection rod 7 is preferably further connected via an associated pivot bearing 7a to an overcenter connection rod connection lever 8. Illustratively, two such overcenter connection rod connection levers 8 are provided and exemplarily arranged laterally with respect to the door corpus 2.

Each overcenter connection rod connection lever 8 is preferably rigidly attached to a latch shaft 9. By way of example, two such latch shafts 9 are provided and exemplarily arranged laterally with respect to the door corpus 2. The two latch shafts 9 and the overcenter connection rod connection levers 8 may also be embodied integrally, i. e. in one piece.

According to one aspect, each latch shaft 9 is rotatable around an associated latch shaft rotation axis 9a for actuation of an associated latch lever 19, which is preferentially rigidly attached to the corresponding latch shaft 9. By way of example, two such latch levers 19 are provided and exemplarily arranged laterally with respect to the door corpus 2. The two latch levers 19 and the latch shafts 9 may also be embodied integrally, i. e. in one piece. The associated latch shaft rotation axis 9a is preferably arranged stationary, i. e. immovable in the door corpus 2. In other words, each latch shaft 9 is preferably rotatable, but not otherwise moveable in the door corpus 2.

Each latch lever 19 is preferably provided with an associated latch roller 19a. The latter is adapted for rolling within a latch bracket 4b that is rigidly mounted to the associated structural frame 4, i. e. the fuselage. In other words, the latch brackets 4b are not door-sided and door-mounted brackets, but instead fuselage-sided, i. e. fuselage-mounted brackets.

Preferably, the latch rollers 19a are provided for latching, in a latching position, the actuatable emergency exit door 1 in closed state. In the latching position, i. e. in the closed state of the actuatable emergency exit door, the latch rollers 19a are preferably blocked, resp. prevented from rolling, by the overcenter connection rods 7 that are arranged in an associated overcentered position.

According to one aspect, each latch shaft 9 is further rigidly attached to at least one associated connection lever 10. The respective latch shaft 9 and the associated connection lever 10 may also be embodied integrally, i. e. in one piece. Furthermore, each connection lever 10 is preferably connected via an associated pivot bearing 10*a* to at least one latch compression spring 11 that biases the respective overcenter connection rod 7 in the closed state of the actuatable emergency exit door 1 into the associated overcentered position. With the respective overcenter connection rod 7 being in the associated overcentered position, an uncontrolled erroneous self-opening of the actuatable emergency exit door 1 is prevented.

By way of example, two latch compression springs 11 are provided that are exemplarily arranged laterally with respect to the door corpus 2. Furthermore, each latch compression spring 11 is preferably rigidly attached to the door corpus 2 by means of a suitable door-sided fixation 12, which preferentially allows at least to some degree a pivoting of the respective latch compression spring 11 with respect to the actuatable emergency exit door 1.

The actuatable emergency exit door 1 is preferably also provided with one or more guide rollers 2*a*, preferentially with at least two such guide rollers. However, for purposes of simplicity and clarity of the drawings, only a single guide roller 2*a* is shown. Each guide roller 2*a* is preferably adapted for rolling within an associated guide roller bracket 4*c* that is rigidly mounted to the associated structural frame 4, i. e. the fuselage. In other words, the guide roller brackets 4*b* are not door-sided and door-mounted brackets, but instead fuselage-sided, i. e. fuselage-mounted brackets. Preferably, the guide rollers 2*a* are provided for guiding the actuatable emergency exit door 1 during opening and closing (lowering and lifting).

It should be noted that all components of the door actuating device 3 that were described so far with reference to FIG. 1 are exemplarily part of the above-mentioned first predetermined number of components of the door actuating device 3, which is preferentially dedicated to unlatching and releasing of the actuatable emergency exit door 1 during the initial translational movement. The above-mentioned second predetermined number of components of the door actuating device 3 that is preferentially dedicated to swiveling of the actuatable emergency exit door 1 during the swiveling opening movement exemplarily comprises all components that are described hereinafter with reference to FIG. 1.

According to one aspect, at least one spring member 14 is provided. By way of example, two such spring members 14 are provided and exemplarily arranged laterally with respect to the door corpus 2. Preferably, each spring member 14 is rigidly attached to the door corpus 2 by means of a suitable door-sided fixation 13, which preferentially allows at least to some degree a pivoting of the respective spring member 14 with respect to the actuatable emergency exit door 1. Each spring member 14 is preferably realized by means of a compression spring.

However, it should be noted that the present invention is not limited to use of compression springs for realization of the spring members 14. Instead, any suitable actuator or biasing means that has a similar behaviour than a compression spring, such as e. g. a hydraulic or pneumatic actuator, may likewise be used for implementation of at least one of the spring members 14. More generally, each spring member 14 preferably implements or at least comprises an energy storage device that is suitable to apply a predetermined load.

Therefore, the spring members 14 are also more broadly referred to as the "energy storage devices 14" hereinafter. This similarly applies to the compression springs 11 described above, which may likewise be implemented by any other suitable actuator or biasing means that has a similar behaviour than a compression spring.

Each spring member 14 is preferably further connected via an associated pivot bearing 15*a* to at least one associated connection lever 15. Each spring member 14 preferably biases its associated connection lever 15 in the closed state of the actuatable emergency exit door 1 such that the spring member 14 is maintained in an overcentered position. In this overcentered position, the spring members 14 are prevented from biasing the actuatable emergency exit door 1 into the fully opened position. Instead, the spring members 14, which are in the overcentered position if the actuatable emergency exit door 1 is in fully closed position, load the actuatable emergency exit door 1 into this fully closed position. However, during opening of the actuatable emergency exit door 1, the spring members 14 preferably bias the actuatable emergency exit door 1 into the fully opened position, in which the actuatable emergency exit door 1 entirely frees exit through the associated structural frame 4, i. e. the fuselage.

Each connection lever 15 is preferably rigidly attached to a connection shaft 16. By way of example, two such connection shafts 16 are provided and exemplarily arranged laterally with respect to the door corpus 2. The two connection shafts 16 and the connection levers 15 may also be embodied integrally, i. e. in one piece.

According to one aspect, each connection shaft 16 is rotatable around an associated connection shaft rotation axis 16*a*. Preferably, at least one connection shaft 16 is further connected to an associated connection lever 17 via an associated pivot bearing 17*a*. By way of example, two such associated connection levers 17 are provided and exemplarily arranged laterally with respect to the door corpus 2, both of which are connected via an associated pivot bearing 17*a* to the respective connection shaft 16.

Each connection lever 17 is preferably further connected via an associated pivot bearing 18*a*, which illustratively defines a rotation axis 20, to a frame-hinged connection rod 18 that is pivotally mountable to the associated structural frame 4, i. e. the fuselage. According to one aspect, the frame-hinged connection rod 18 is provided with a locking bolt 18*b*, which is exemplarily arranged at the associated pivot bearing 18*a*.

By way of example, two frame-hinged connection rods 18 are provided and exemplarily hinged-mounted to the associated structural frame 4, i. e. the fuselage. In other words, the frame-hinged connection rods 18 are mounted to the associated structural frame 4, i. e. the fuselage, such that they are both rotatable around an associated frame-sided hinge axis 4*a*, which is preferably identical for both frame-hinged connection rods 18. The frame-hinged connection rods 18 are preferably provided for enabling an opening movement of the actuatable emergency exit door 1 with respect to the associated structural frame 4 during opening, in particular the above-mentioned swiveling opening movement in the second phase.

According to one aspect, the actuatable emergency exit door 1 further comprises at least one door-mounted goose neck-shaped structure 21 that is mountable to the associated structural frame 4, i. e. the fuselage, for enabling the initial translational opening movement and subsequently the swiveling opening movement of the actuatable emergency exit door 1 with respect to the associated structural frame 4, i. e.

the fuselage, during opening. Illustratively, two such door-mounted goose neck-shaped structures 21 are provided and exemplarily arranged laterally with respect to the door corpus 2, both of which are preferentially rigidly attached to the door corpus 2 or embodied integrally therewith, i. e. embodied in one piece therewith.

Each door-mounted goose neck-shaped structure 21 exemplarily comprises a triangular base portion that is connected to the door corpus 2, as well as an arcuate portion that extends from a corner of the triangular base portion and that defines the goose neck shape. This arcuate portion is preferably provided with a locking bolt 22 that defines a rotation axis 22a, around which the door-mounted goose neck-shaped structure 21 is rotatable during opening of the actuatable emergency exit door 1.

Each door-mounted goose neck-shaped structure 21, i. e. each locking bolt 22, is preferably further connected via a respective hinge 23 to an associated frame-resp. fuselage-sided hinge 24. By way of example, two such frame-sided hinges 24 are provided and exemplarily hinged-mounted to the associated structural frame 4, i. e. the fuselage. In other words, the hinges 23 are mounted to the associated structural frame 4, i. e. the fuselage, such that the door-mounted goose neck-shaped structures 21 are both rotatable around an associated frame-sided hinge axis 24a.

Figure 2:
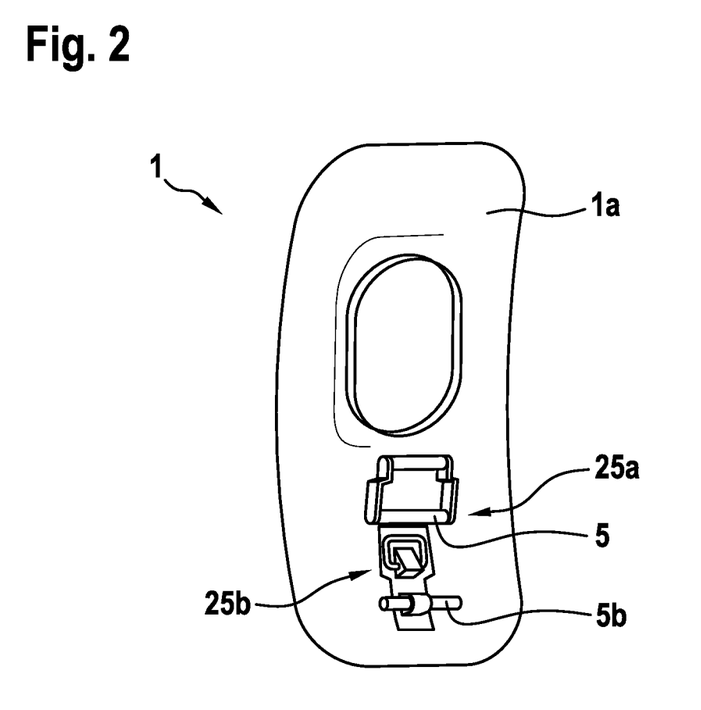
FIG. 2 shows the actuatable emergency exit door of FIG. 1 with associated inner and outer operation handles.

FIG. 2 shows the actuatable emergency exit door 1 of FIG. 1 with the door outer skin 1a and the at least one actuatable drive shaft 5 of FIG. 1. According to one aspect, the at least one actuatable drive shaft 5 is connected to an inner handle 25a, i. e. a handle that is arranged inside the structural frame 4, i. e. the fuselage of FIG. 1, when the actuatable emergency exit door 1 is in the fully closed position. The inner handle 25a is adapted to allow actuation of the door actuating device 3 of FIG. 1 from the inside of the structural frame 4, i. e. the fuselage of FIG. 1.

Preferably, the actuatable emergency exit door 1 is further provided with an outer handle 25b that is connected to an outer handle shaft 5b. The outer handle 25b is preferably arranged outside of the structural frame 4, i. e. the fuselage of FIG. 1, when the actuatable emergency exit door 1 is in the fully closed position. The outer handle 25b is adapted to allow actuation of the door actuating device 3 of FIG. 1 from the outside of the structural frame 4, i. e. the fuselage of FIG. 1, by means of the outer handle shaft 5b, which is e. g. operationally connected to the actuatable drive shaft 5 by any suitable means that may also be well-known to the person skilled in the art.

Operation of the actuatable emergency exit door 1 is described hereinafter with reference to FIG. 3 to FIG. 6. More specifically, the above-mentioned initial translational movement corresponding to a first opening phase that is intended for unlatching and releasing of the actuatable emergency exit door 1 is described hereinafter with reference to FIG. 3. The above-mentioned swiveling opening movement corresponding to a second opening phase that is intended for fully freeing exit through the structural frame 4, i. e. the fuselage of FIG. 1 via the actuatable emergency exit door 1 in fully opened position is described below with reference to FIG. 4 to FIG. 6.

Figure 3:
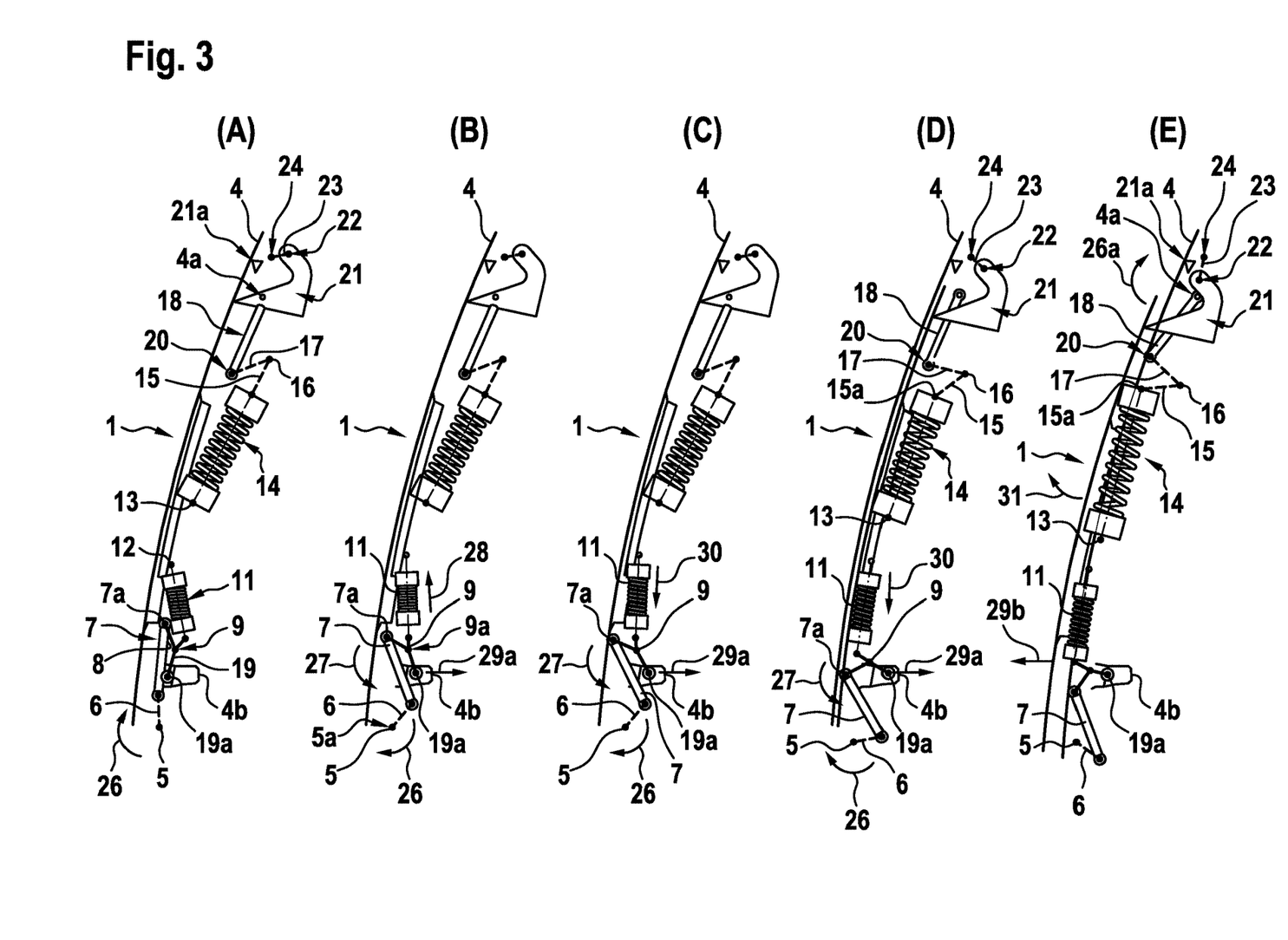
FIG. 3 shows a first phase of an opening procedure for opening of the actuatable emergency exit door of FIG. 1 according to the present invention.

FIG. 3 shows the actuatable emergency exit door 1 of FIG. 1 with the door actuating device 3 of FIG. 1 during the initial translational movement of the actuatable emergency exit door 1 with respect to the associated structural frame 4, i. e. the fuselage of FIG. 1, to which the actuatable emergency exit door 1 is mounted. The initial translational movement is schematically illustrated in five sequentially arranged parts (A) to (E) in side view for explaining operation of the door actuating device 3 during the initial translational movement.

According to part (A), the initial translational movement is preferably initiated by actuating the actuatable drive shaft 5. More specifically, the actuatable drive shaft 5 is preferentially rotated around the drive shaft rotation axis 5a in an opening rotation direction 26, e. g. by actuation of the inner handle 25a or the outer handle 25b of FIG. 2.

According to part (B), as the actuatable drive shaft 5 is further rotated in the opening rotation direction 26, a pivotal movement of the drive shaft connection levers 6 around the drive shaft rotation axis 5a into the opening rotation direction 26 is forced. Preferably, the drive shaft connection levers 6 entrain the overcenter connection rods 7 into an opening movement direction 27, whereby the overcenter connection rods 7 are moved from an associated overcentered position into an operational, non-overcentered position. The overcenter connection rods 7 thereby preferentially push the latch rollers 19a into an inward movement direction 29a with respect to the structural frame 4, i. e. the fuselage, within the latch brackets 4b, and preferably compress the compression springs 11 in a compression direction 28 by pushing them towards the door-sided fixations 12. Thereby, the compression springs 11 are loaded and preferably also moved from an associated overcentered position into an operational, non-overcentered position.

According to part (C), as the actuatable drive shaft 5 is still rotated in the opening rotation direction 26, the overcenter connection rods 7 are moved further into the opening movement direction 27, so that pushing of the latch rollers 19a into the inward movement direction 29a with respect to the structural frame 4, i. e. the fuselage, within the latch brackets 4b continues. Furthermore, the compression springs 11 preferably reach their operational, non-overcentered position and, therefore, now preferentially load the latch shafts 9 by expanding into an associated expansion direction 30 such that at least further movement of the latch rollers 19a into the inward movement direction 29a is supported by the load of the compression springs 11. Thereby, a comparatively slight inward movement of the actuatable emergency exit door 1 with respect to the structural frame 4, i. e. the fuselage, in the inward movement direction 29a is preferably initiated.

According to part (D), as the actuatable drive shaft 5 is still rotated in the opening rotation direction 26, the overcenter connection rods 7 are still moved further into the opening movement direction 27, so that the latch rollers 19a are preferably pushed by the load of the compression springs 11 into the inward movement direction 29a with respect to the structural frame 4, i. e. the fuselage, within the latch brackets 4b into a final position, in which any further inward movement of the latch rollers 19a is illustratively blocked by the guide brackets 4c. Thereby, the comparatively slight inward movement of the actuatable emergency exit door 1 with respect to the structural frame 4, i. e. the fuselage, in the inward movement direction 29a is preferentially completed and a translational movement of the actuatable emergency exit door 1 with respect to the structural frame 4, i. e. the fuselage, in a downward direction that corresponds to the expansion direction 30 of the compression springs 11 is preferably initiated.

In this translational movement, the door-mounted goose neck-shaped structures 21 are preferably rotated by means of the hinges 23 around the fuselage-sided hinges 24 in a rotation direction that corresponds to the opening rotation direction 26. Furthermore, by means of this translational movement, the spring members 14 are preferentially moved in the downward direction that corresponds to the expansion direction 30 of the compression springs 11 with respect to the frame-hinged connection rods 18 that are mounted to the associated structural frame 4, i. e. the fuselage, whereby the connection shafts 16 are moved from an overcentered position towards an opening support, non-overcentered position. Likewise, the spring members 14 are moved into an opening support position. This is accomplished by cooperation of the connection levers 15, the connection shafts 16, the connection levers 17 and the frame-hinged connection rods 18.

According to part (E), as the actuatable drive shaft 5 is still further rotated in the opening rotation direction 26 and the overcenter connection rods 7 are still moved further into the opening movement direction 27 according to part (D), the latch rollers 19a are preferably pulled by the load of the compression springs 11 into an outward movement direction 29b with respect to the structural frame 4, i. e. the fuselage, within the latch brackets 4b. Thereby, the translational movement of the actuatable emergency exit door 1 with respect to the structural frame 4, i. e. the fuselage, in the downward direction that corresponds to the expansion direction 30 of the compression springs 11 is preferentially completed so that the actuatable emergency exit door 1 is in a fully lowered position. Thus, an outward movement of the actuatable emergency exit door 1 with respect to the structural frame 4, i. e. the fuselage, into an outward direction that corresponds to the outward movement direction 29b is preferably initiated, whereby the door-mounted goose neck-shaped structures 21 and, more specifically, their locking bolts 22 are preferably blocked at respective frame-sided blocking counterparts 21a.

It should be noted that according to one aspect the spring members 14 are expanded and, thus, preferably loaded during the translational movement of the actuatable emergency exit door 1 with respect to the structural frame 4, i. e. the fuselage, in the downward direction. Furthermore, the spring members 14 and the connection shafts 16 are preferably moved into their opening support, non-overcentered positions, in which the spring members 14 are not biasing the connection shafts 16 into their overcentered position any more, i. e. in which they are no more biasing the actuatable emergency exit door 1 into its fully closed position.

Consequently, the initial translational movement corresponding to the first opening phase is completed and the above-mentioned swiveling opening movement corresponding to a second opening phase that is intended for fully freeing exit through the structural frame 4, i. e. the fuselage, via the actuatable emergency exit door 1 can be performed. This swiveling opening movement consists in a swiveling of the actuatable emergency exit door 1 in a swiveling movement direction 31, that is essentially achieved by rotating the door-mounted goose neck-shaped structures 21 and the frame-hinged connection rods 18 around their respective rotation axes 22a resp. 4a of FIG. 1 into a swiveling movement direction 26a.

Figure 4:
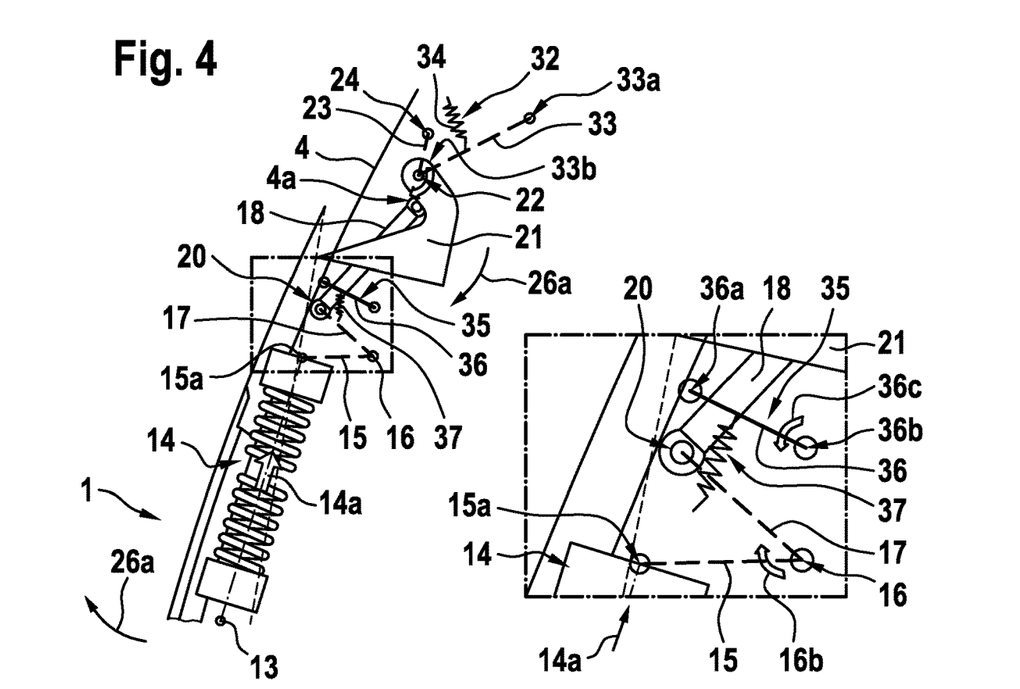
FIG. 4 to FIG. 6 show a second phase of an opening procedure for opening of the actuatable emergency exit door of FIG. 1 according to the present invention.
Figure 5:
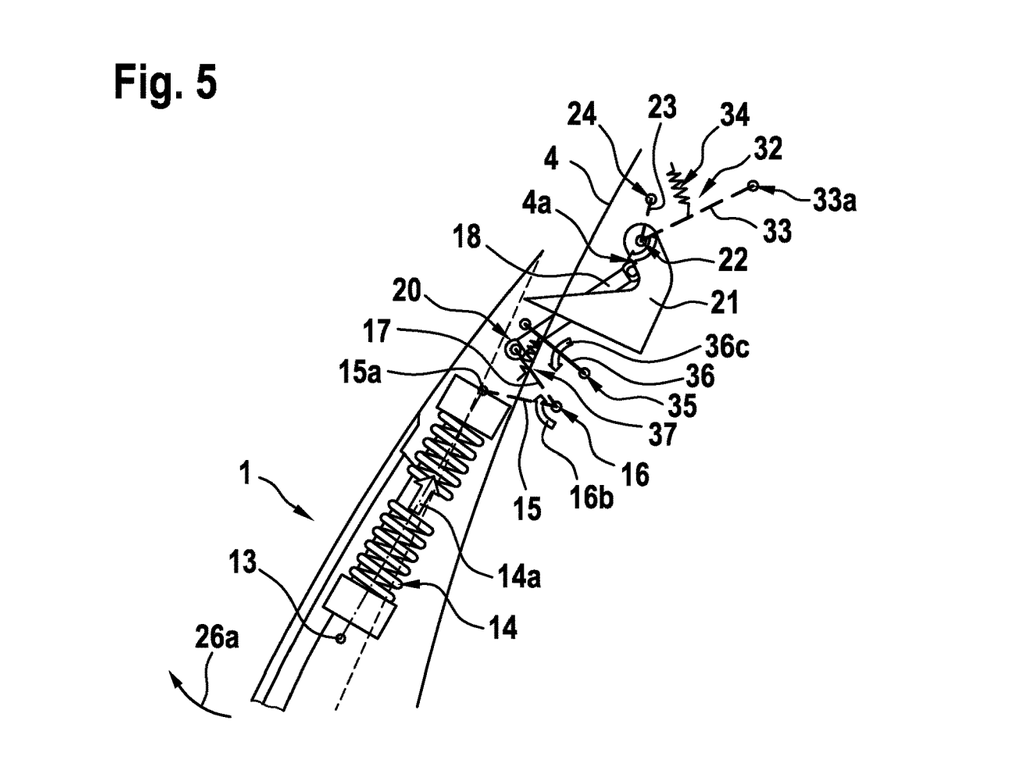
Figure 6:
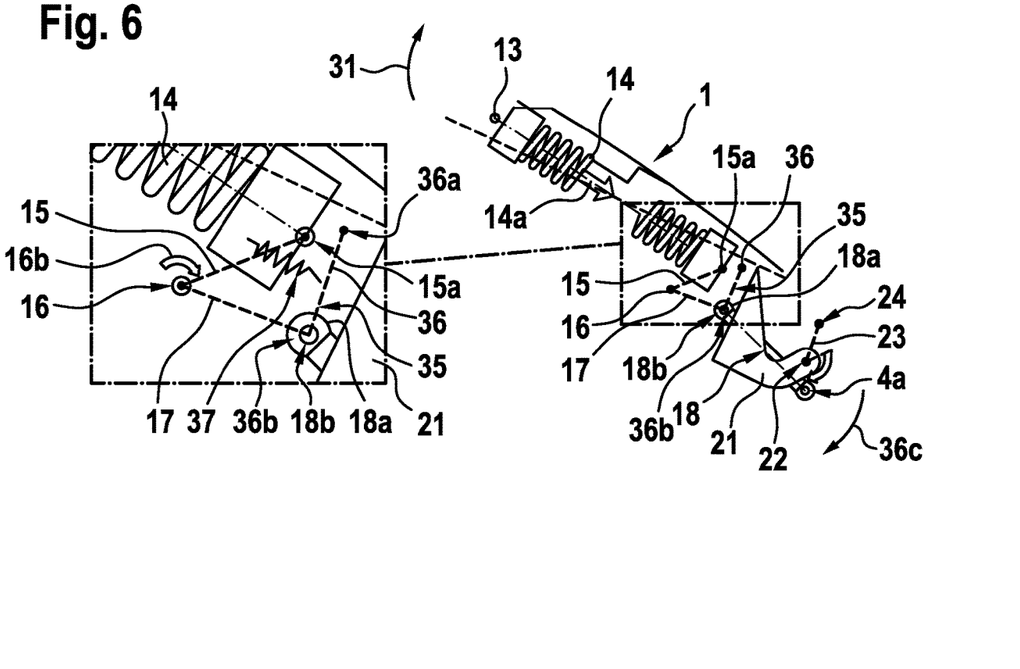

FIG. 4 to FIG. 6 show an upper portion of the actuatable emergency exit door 1 of FIG. 1 and the door actuating device 3 of FIG. 1 during the swiveling opening movement of the actuatable emergency exit door 1 in the swiveling movement direction 31 of FIG. 3(E) with respect to the structural frame 4, i. e. the fuselage, of FIG. 1. Furthermore, a fully opened position retaining device according to one aspect is illustrated, which preferably comprises at least one hinge lock device 32 and at least one gust lock device 35.

It should be noted that only a single hinge lock device 32 and a single gust lock device 35 are described hereinafter, for simplicity and brevity. However, two or more hinge lock devices and gust lock devices may likewise be provided.

The hinge lock device 32 is preferably provided for locking an associated one of the door-mounted goose neck-shaped structures 21 of FIG. 3 in locked state. More specifically, according to one aspect the hinge lock device 32 comprises a hinge lock locking lever 33 that can pivot around an associated pivot axis 33a defined at the structural frame 4, i. e. the fuselage. Preferably, the hinge lock locking lever 33 is loaded by a spring element 34, e. g. a tension spring, that is preferentially mounted to the structural frame 4, i. e. the fuselage, into a locking position. The hinge lock locking lever 33 preferably comprises a locking part 33b that preferentially locks the associated one of the door-mounted goose neck-shaped structures 21 and, more specifically, its associated locking bolt 22 in the locked state, i. e. when the hinge lock locking lever 33 is in its locking position, wherein the associated locking bolt 22 is preferentially blocked at the respective frame-sided blocking counterpart 21a according to FIG. 3(E). However, in the locked state the associated one of the door-mounted goose neck-shaped structures 21 is preferably still capable of rotating in the swiveling movement direction 26a.

The gust lock device 35 is preferably provided for blocking a swiveling movement of the actuatable emergency exit door 1 relative to the connection rods 18 from the fully opened position of the actuatable emergency exit door 1 into an egress obstructing position. According to one aspect, the gust lock device 35 comprises a locking lever 36 that is preferably biased by means of a spring element 37, e. g. a tension spring, in a lever movement direction 36c into a locking position. Preferentially, the locking lever 36 is hinged-mounted to the door corpus 2 of FIG. 1 of the actuatable emergency exit door 1 at a respective hinged part 36a. Likewise, the spring element 37 is exemplarily also mounted to the door corpus 2. Preferably, the locking lever 36 is provided for engaging the locking bolt 18b of an associated one of the frame-hinged connection rods 18 of FIG. 1 in a locking position, preferentially by means of a locking part 36b provided at the locking lever 36. More specifically, the locking bolt 18b is preferentially automatically engaged by the gust lock device 35 when the actuatable emergency exit door 1 reaches the fully opened position during opening.

According to one aspect, during opening of the actuatable emergency exit door 1 into the fully opened position, the spring member 14 that comprises at least one energy storage device generates in its opening support position a load 14a that is preferably reacted into the structural frame 4, i. e. the fuselage, for generating an opening moment. The load 14a preferentially acts on the connection lever 15, which is thus biased in a movement direction 16b towards the connection rod 18 such that the latter is forced to rotate around the associated frame-sided hinge axis 4a of FIG. 3(E). This is enabled by the connection shaft 16, which is according to FIG. 3(E) in its opening support, non-overcentered position. Thus, the spring member 14 preferentially loads the actuatable emergency exit door 1 into the fully opened position.

The load 14a of the spring member 14 that is exerted on the actuatable emergency exit door 1 preferably forces a swiveling movement of the latter in the swiveling movement direction 26a. During this swiveling movement, the connection rod 18 and, thus, its locking bolt 18b is preferentially moved relative to the gust lock device 35, as illustrated in FIG. 5.

At the end of the swiveling movement of the actuatable emergency exit door 1, the actuatable emergency exit door 1 preferably reaches the fully opened position and a further swiveling opening movement of the actuatable emergency exit door 1 is no more possible. Preferably, an associated emergency exit area in the structural frame 4, i. e. the fuselage, is then completely freed and unobstructed. Furthermore, as described above, the locking bolt 18b of the connection rod 18 is preferentially automatically engaged by the locking lever 36 of the gust lock device 35 when the actuatable emergency exit door 1 reaches the fully opened position, so that a closing swiveling movement of the actuatable emergency exit door 1 is prevented, as illustrated in FIG. 6.

Figure 7:
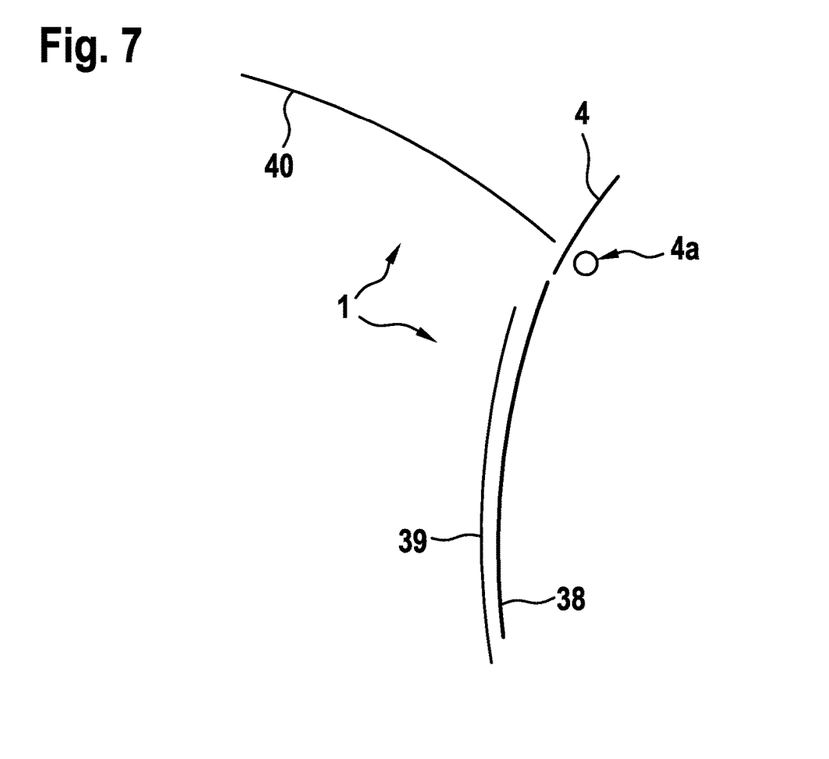
FIG. 7 shows a schematic view of the actuatable emergency exit door of FIG. 1 in different operation positions.

FIG. 7 schematically shows the actuatable emergency exit door 1 of the preceding figures that is mounted to the structural frame 4, i. e. the fuselage, of FIG. 1. By way of example, the frame-sided hinge axis 4a of the connection rods 18 of FIG. 1 is also shown, as a reference point.

Illustratively, the actuatable emergency exit door 1 is shown in its three different main positions: the fully closed position, the fully lowered position and the fully opened position. The fully closed position, which corresponds to FIG. 3(A), is labelled with the reference sign 38. The fully lowered position, which corresponds to FIG. 3(E), is labelled with the reference sign 39, and the fully opened position, which corresponds to FIG. 6, is labelled with the reference sign 40.

Figure 8:
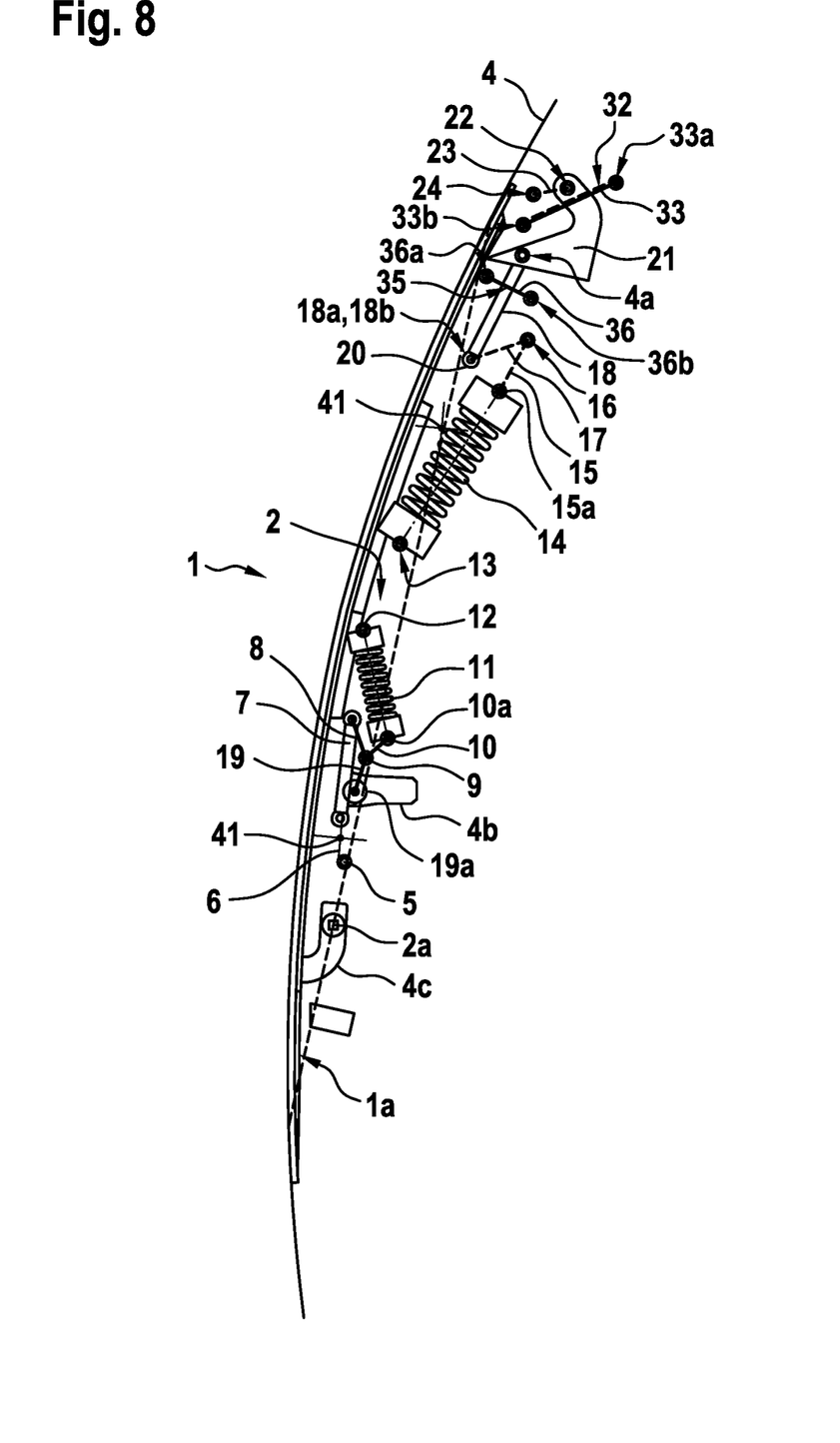
FIG. 8 shows a schematic side view of the actuatable emergency exit door of FIG. 1.

FIG. 8 shows the actuatable emergency exit door 1 of the preceding figures that is mounted to the structural frame 4, i. e. the fuselage, of the preceding figures in fully closed position. FIG. 8 further illustrates the overcentered positions of the connection rods 7 and 18, the compression springs 11 as well as the spring members 14.

More specifically, illustratively the compression springs 11 load the connection rods 7 into the overcentered position by biasing the latch shafts 9 via the connection levers 10—in FIG. 8—downward. Thus, the connection rods 7 are maintained by the compression springs 11 in the overcentered position and the latch rollers 19a are maintained in an immobile standby position. Furthermore, the spring members 14 load the connection rods 18 into the overcentered position by biasing the connection shafts 16 via the connection levers 15—in FIG. 8—upward. Thus, the connection rods 18 are maintained by the spring members 14 in the overcentered position and the door-mounted goose neck-shaped structures 21 are maintained in a stationary standby position, so that the actuatable emergency exit door 1 is maintained in its fully closed position.

According to one aspect, the actuatable emergency exit door 1 further comprises at least one and, preferably, four or more suitable door stops 41, which cooperate with respective stop fittings that are provided at the structural frame 4, i. e. fuselage. By way of example, only two door stops 41 are schematically shown. However, configuration, implementation and functionality of such door stop/stop fitting arrangements are well-known to the person skilled in the art and not considered as being part of the present invention. Therefore, a detailed explanation thereof is omitted for brevity and conciseness.

FIG. 8 further illustrates the guide roller 2a of FIG. 1, which is provided for rolling inside of the associated guide roller bracket 4c. This guide roller 2a and the associated guide roller bracket 4c are preferably configured such that the guide roller 2a guarantees the above-described initial inward movement of the actuatable emergency exit door 1 and may only leave the associated guide roller bracket 4c if the actuatable emergency exit door 1 is in its fully lowered position according to FIG. 3(E), so that the guide roller 2a is in a released state. Accordingly, the above described swiveling opening movement that corresponds to the second opening phase that is intended for fully freeing exit through the structural frame 4, i. e. the fuselage of FIG. 1 via the actuatable emergency exit door 1, can only be initiated and performed when the guide roller 2a is in the released state and the actuatable emergency exit door 1 is in its fully lowered position according to FIG. 3(E).

Figure 9:
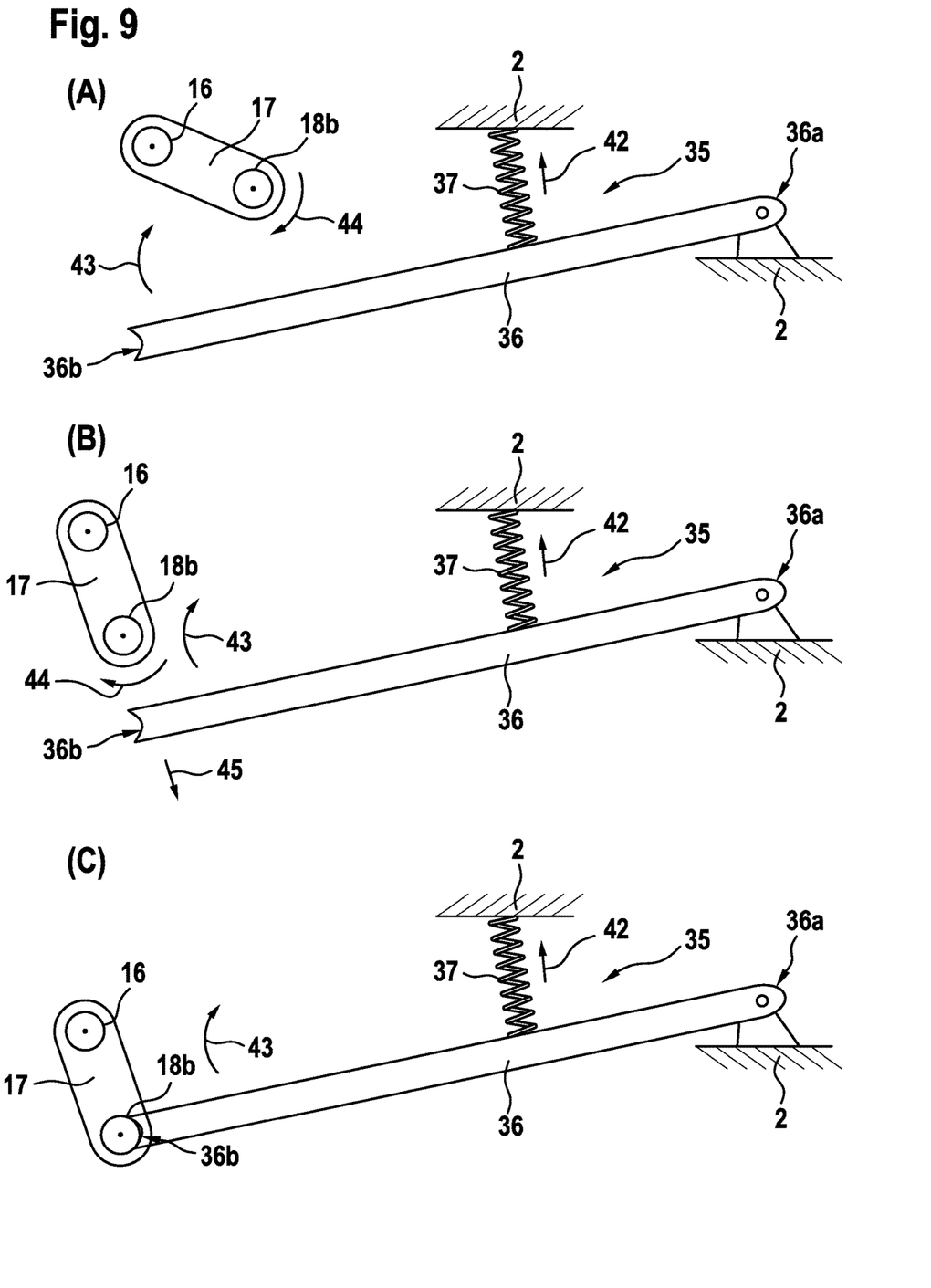
FIG. 9 shows an engaging procedure of a gust lock device according to the present invention.

FIG. 9 shows the gust lock device 35 of FIG. 4 to FIG. 6 in greater detail for further illustrating a preferred functioning thereof in three parts (A) to (C). FIG. 9 also further illustrates a preferred door-sided mounting of the tension spring 37 and the locking lever 36 that is preferably hinged-mounted to the door corpus 2 of FIG. 1 of the actuatable emergency exit door 1 of the preceding figures at the hinged part 36a. Illustratively, the tension spring 37 loads the locking lever 36 into a tension direction 42.

As illustrated in part (A), by loading the locking lever 36 into the tension direction 42, the tension spring 37 pulls the locking lever 36 into a locking lever locking movement direction 43. Furthermore, as described above with reference to FIG. 4 to FIG. 6, the connection lever 17 of the door actuating device 3 of the preceding figures is rotated in a connection lever locking movement direction 44 during opening of the actuatable emergency exit door 1 of the preceding figures.

The opposing movements of the connection lever 17 and the locking lever 36 entrain a contact of both levers 17, 36, from which a deflection in a deflection direction 45 of the locking lever 36 results, as illustrated in part (B). It should be noted that no contact is shown between the levers 17, 36 for simplicity and clarity of the drawings. However, the functioning as such is clearly derivable from the drawings in the context of this description.

Finally, when the connection lever 17 and, thus, the locking bolt 18b have passed the locking lever 36, the latter is automatically pulled by the tension spring 37 into the locking position illustrated in part (C). In this locking position, the locking part 36b of the locking lever 36 engages the locking bolt 18b, so that a swiveling movement of the actuatable emergency exit door 1 of the preceding figures from its fully opened position into an egress obstructing position is prevented.

Figure 10:
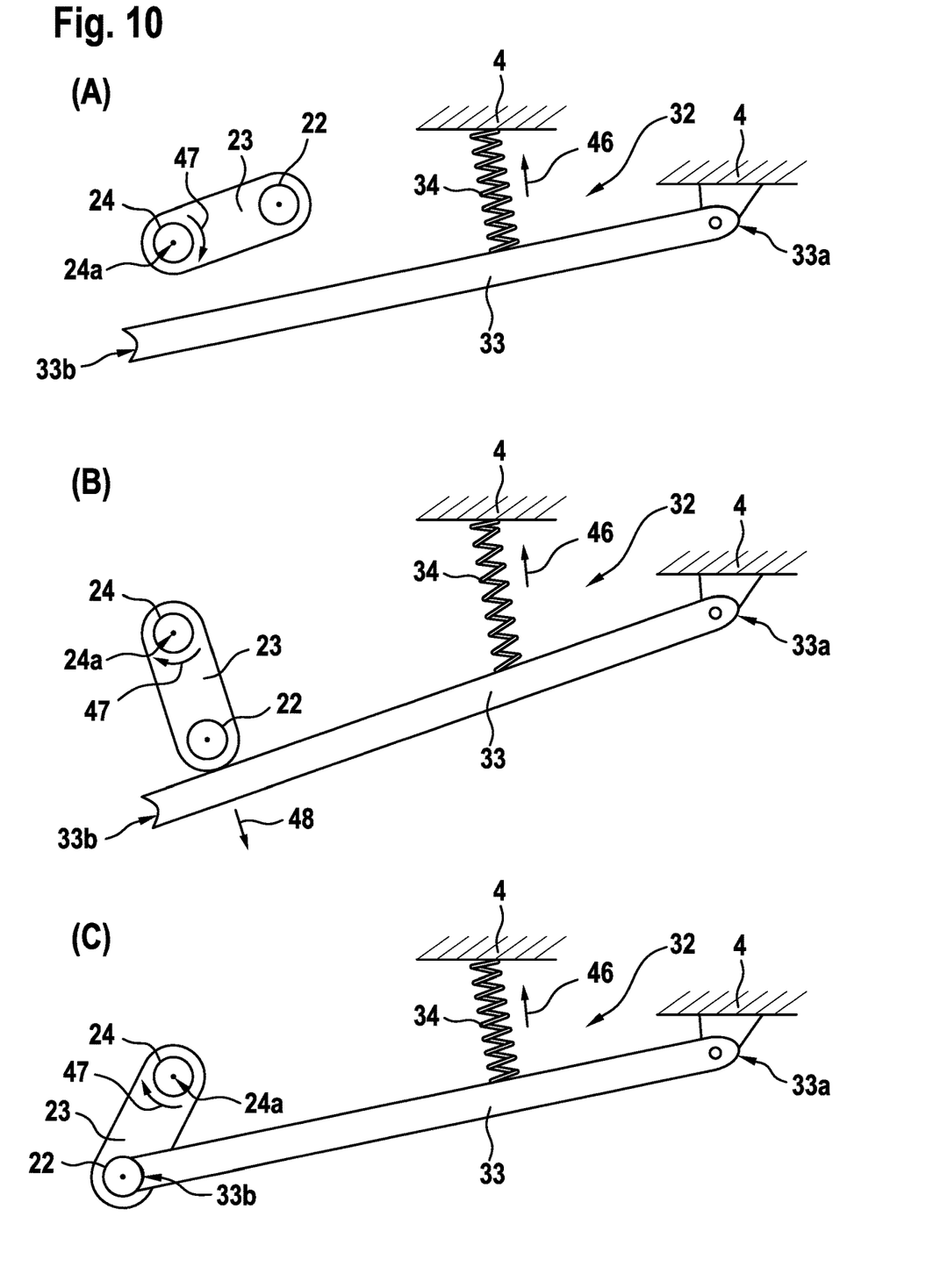
FIG. 10 shows an engaging procedure of a hinge lock device according to the present invention.

FIG. 10 shows the hinge lock device 32 of FIG. 4 and FIG. 5 in greater detail for further illustrating a preferred functioning thereof in three parts (A) to (C). FIG. 10 also further illustrates a preferred frame-resp. fuselage-sided mounting of the tension spring 34 and the hinge lock locking lever 33 that is preferably hinged-mounted to the structural frame 4, i. e. the fuselage of FIG. 1 of the actuatable emergency exit door 1 of the preceding figures at its pivot axis 33a. Illustratively, the tension spring 34 loads the hinge lock locking lever 33 into a tension direction 46.

As illustrated in part (A), by loading the hinge lock locking lever 33 into the tension direction 46, the tension spring 34 pulls the hinge lock locking lever 33 into the tension direction 46. Furthermore, as described above with reference to FIG. 4 and FIG. 5, the hinge 23 of the door actuating device 3 of the preceding figures is rotated in a locking rotation direction 47 around the hinge axis 24a during opening of the actuatable emergency exit door 1 of the preceding figures.

Such a rotation of the hinge 23 and pulling of the hinge lock locking lever 33 entrain a contact of the locking bolt 22 of the associated one of the door-mounted goose neck-shaped structures 21 of FIG. 4 and FIG. 5, from which a deflection in a deflection direction 48 of the hinge lock locking lever 33 results, as illustrated in part (B).

Finally, when the locking bolt 22 has passed the hinge lock locking lever 33, the latter is automatically pulled by the tension spring 34 into the locking position illustrated in part (C). In this locking position, the locking part 33b of the hinge lock locking lever 33 engages the locking bolt 22, so that the associated one of the door-mounted goose neck-shaped structures 21 of FIG. 3 is locked in locked state.

It should be noted that modifications to the above described embodiments are within the common knowledge of the person skilled in the art and, thus, also considered as being part of the present invention.

REFERENCE LIST 1 actuatable emergency exit door
1a door outer skin
2 door corpus
2a door guide rollers
3 door actuating device
4 fuselage
4a frame-sided hinge axis
4b fuselage-sided latch bracket
4c fuselage-sided guide roller bracket
5 actuatable drive shaft
5a drive shaft rotation axis
5b outer handle shaft
6 drive shaft connection levers
6a drive shaft connection levers pivot bearings
7 overcenter connection rods
7a overcenter connection rods pivot bearings
8 overcenter connection rods connection levers
9 latch shafts
9a latch shafts rotation axes
10 latch compression springs connection levers
10a latch compression springs pivot bearings
11 latch compression springs
12 latch compression springs door-sided fixations
13 energy storage devices door-sided fixations
14 energy storage devices
14a energy storage devices load
15 energy storage devices connection levers
15a energy storage devices pivot bearings
16 connection shafts
16a connection shafts rotation axes
16b connections shafts movement direction
17 frame-hinged connection rods connection levers
17a frame-hinged connection rods connection levers pivot bearings
18 frame-hinged connection rods
18a frame-hinged connection rods pivot bearings
18b gust lock locking bolt
19 latch levers
19a latch levers rollers
20 frame-hinged connection rods connection levers rotation axes
21 door-mounted goose necks
21a fuselage-sided blocking counterparts
22 goose neck lock locking bolts
22a goose necks rotation axes
23 hinges
24 fuselage-sided hinges
24a fuselage-sided hinge axes
25a actuatable emergency exit door inner handle
25b actuatable emergency exit door outer handle
26 actuatable drive shaft opening rotation direction
26a swiveling movement direction
27 overcenter connection rods opening movement directions
28 latch compression springs compression direction
29a latch lever rollers inward movement direction
29b latch lever rollers outward movement direction
30 latch compression springs expansion direction
31 actuatable emergency exit door swiveling movement direction
32 hinge lock device
33 hinge lock locking lever
33a hinge lock locking lever axis
33b hinge lock locking lever locking part
34 hinge lock tension spring
35 gust lock device
36 gust lock locking lever
36a gust lock locking lever hinged part
36b gust lock locking lever locking part
36c gust lock locking lever movement direction
37 gust lock tension spring
38 actuatable emergency exit door fully closed position
39 actuatable emergency exit door fully lowered position
40 actuatable emergency exit door fully opened position
41 door stops
42 gust lock tension spring tension direction
43 gust lock locking lever locking movement direction
44 frame-hinged connection rods connection levers locking movement direction
45 gust lock locking lever deflection movement direction
46 hinge lock tension spring tension direction
47 hinge lock locking bolts connection levers locking rotation direction
48 hinge lock locking lever deflection movement direction

What is claimed is:

1. An actuatable emergency exit door actuatable between different operating positions relative to an associated structural frame that is adapted for accommodating the actuatable emergency exit door in closed state, the door having a door actuating device that comprises at least two connection rods, at least one goose neck-shaped structure and at least one spring member, wherein the at least two connection rods are pivotally mountable to the associated structural frame and being provided for enabling an opening movement of the actuatable emergency exit door with respect to the associated structural frame during opening, wherein the at least one goose neck-shaped structure is enabling an initial translational opening movement and subsequently a swiveling opening movement of the actuatable emergency exit door with respect to the associated structural frame during opening, wherein the at least one goose neck-shaped structure is door-mounted by being at least rigidly attached to a door corpus of the actuatable emergency exit door, at least one of the at least two connection rods is pivotably mountable to the associated structural frame and coupled to the at least one spring member, the at least one spring member is rigidly attached to the door corpus and is provided for biasing the actuatable emergency exit door during opening into a fully opened position in which the actuatable emergency exit door entirely frees exit through the associated structural frame.

2. The actuatable emergency exit door of claim 1, wherein the at least one spring member comprises at least one energy storage device, wherein a load generated by the at least one energy storage device during opening of the actuatable emergency exit door into the fully opened position is reacted into the associated structural frame for generating an opening moment.

3. The actuatable emergency exit door of claim 2, wherein the at least one spring member is in an overcentered position if the actuatable emergency exit door is in a fully closed position, wherein the at least one spring member in the overcentered position loads the actuatable emergency exit door into the fully closed position.

4. The actuatable emergency exit door of claim 3, wherein the at least one spring member is in an opening support position during opening of the actuatable emergency door, wherein the at least one spring member in the opening support position loads the actuatable emergency exit door into a fully opened position, the at least one spring member being moved during opening of the actuatable emergency door from the overcentered position into the opening support position.

5. The actuatable emergency exit door of claim 1, wherein a fully opened position retaining device is provided.

6. The actuatable emergency exit door of claim 5, wherein the fully opened position retaining device comprises a gust lock device that is provided for blocking a swiveling movement of the actuatable emergency exit door relative to the at least two connection rods from the fully opened position into an egress obstructing position.

7. The actuatable emergency exit door of claim 6, wherein at least one of the at least two connection rods is provided with a locking bolt that is automatically engaged by the gust lock device when the actuatable emergency exit door reaches the fully opened position during opening.

8. The actuatable emergency exit door of claim 7, wherein the gust lock device comprises a locking lever for engaging the locking bolt in a locking position.

9. The actuatable emergency exit door of claim 8, wherein the gust lock device comprises a spring element that biases the locking lever into the locking position.

10. The actuatable emergency exit door of claim 9, wherein the locking lever is hinged-mounted to a door corpus of the actuatable emergency exit door.

11. The actuatable emergency exit door of claim 1, wherein the door actuating device further comprises at least one latch roller that is provided for latching, in a latching position, the actuatable emergency exit door in closed state.

12. The actuatable emergency exit door of claim 11, wherein the door actuating device further comprises at least one overcenter connection rod that is provided for blocking the at least one latch roller in the latching position in the closed state of the actuatable emergency exit door.

13. The actuatable emergency exit door of claim 12, wherein the door actuating device further comprises at least one latch compression spring that biases the at least one overcenter connection rod into an associated overcentered position in the closed state of the actuatable emergency exit door.

14. The actuatable emergency exit door of claim 1, wherein the associated structural frame is defined by a fuselage of an aircraft or space craft with a pressurized cabin, wherein the actuatable emergency exit door defines an emergency exit hatch.

15. An aircraft or space craft with a pressurized cabin, comprising an actuatable emergency exit door according to claim 1.

16. An actuatable emergency exit door actuatable between different operating positions relative to an associated structural frame adapted for accommodating the actuatable emergency exit door in closed state, the door having a door actuator comprising at least two connection rods, at least one goose neck-shaped structure and at least one spring, wherein the at least two connection rods are pivotally mountable to the associated structural frame to enable an opening movement of the actuatable emergency exit door with respect to the associated structural frame during opening, wherein the at least one goose neck-shaped structure enables an initial translational opening movement and subsequently a swiveling opening movement of the actuatable emergency exit door with respect to the associated structural frame during opening,
wherein the at least one goose neck-shaped structure is rigidly attached to a door corpus of the actuatable emergency exit door, at least one of the at least two connection rods is pivotally mountable to the associated structural frame and coupled to the at least one spring, the at least one spring is rigidly attached to the door corpus and to bias the actuatable emergency exit door during opening into a fully opened position in which the actuatable emergency exit door entirely frees exit through the associated structural frame.

17. The actuatable emergency exit door of claim 16, wherein a load generated by the at least one spring during opening of the actuatable emergency exit door into the fully opened position is reacted into the associated structural frame for generating an opening moment.

18. The actuatable emergency exit door of claim 17, wherein the at least one spring is in an overcentered position if the actuatable emergency exit door is in a fully closed position, wherein the at least one spring in the overcentered position loads the actuatable emergency exit door into the fully closed position.

19. The actuatable emergency exit door of claim 18, wherein the at least one spring is in an opening support position during opening of the actuatable emergency door, wherein the at least one spring in the opening support position loads the actuatable emergency exit door into a fully opened position, the at least one spring being moved during opening of the actuatable emergency door from the overcentered position into the opening support position.

20. The actuatable emergency exit door of claim 16, wherein a fully opened position retaining device is provided.

* * * * *